US008082430B2

(12) United States Patent
Valentine et al.

(10) Patent No.: US 8,082,430 B2
(45) Date of Patent: Dec. 20, 2011

(54) REPRESENTING A PLURALITY OF INSTRUCTIONS WITH A FEWER NUMBER OF MICRO-OPERATIONS

(75) Inventors: Robert Valentine, Qiryat Tivon (IL); Ittai Anati, Haifa (IL); Zeev Sperber, Zichron Yaakov (IL); Ido Ouziel, Haifa (IL); Gregory Pribush, Haifa (IL); Amir Leibovitz, Biniamina (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/200,777

(22) Filed: Aug. 9, 2005

(65) Prior Publication Data

US 2007/0038844 A1 Feb. 15, 2007

(51) Int. Cl.
*G06F 9/00* (2006.01)
(52) U.S. Cl. .................. 712/245; 712/208; 712/E9.054
(58) Field of Classification Search .................. 712/208, 712/E9.054, 219
See application file for complete search history.

(56) References Cited

U.S. PATENT DOCUMENTS

| | | | | |
|---|---|---|---|---|
| 5,903,761 | A * | 5/1999 | Tyma | 717/148 |
| 6,889,318 | B1 * | 5/2005 | Wichman | 712/226 |
| 7,343,482 | B2 * | 3/2008 | Biles et al. | 712/242 |
| 2003/0236967 | A1 * | 12/2003 | Samra et al. | 712/210 |
| 2004/0034757 | A1 * | 2/2004 | Gochman et al. | 711/219 |
| 2004/0128480 | A1 * | 7/2004 | Anati et al. | 712/214 |
| 2004/0139429 | A1 * | 7/2004 | Ronen et al. | 717/159 |
| 2004/0199755 | A1 * | 10/2004 | Sperber et al. | 712/244 |
| 2004/0233930 | A1 * | 11/2004 | Colby, Jr. | 370/464 |
| 2005/0060524 | A1 * | 3/2005 | Anati et al. | 712/245 |
| 2006/0277398 | A1 * | 12/2006 | Akkary et al. | 712/245 |

OTHER PUBLICATIONS

John L. Hennessy; David A. Patterson, "Computer Architecture A Quantitative Approach, 3rd Edition" Published: 2003; Pertinent pp. 202, 221, 229, 864-865.*
Office Action received for CN Patent Application No. 200610111159.6, mailed on Aug. 14, 2009, 11 pages inclusive of English translation.
Office Action from Foreign Counterpart China Application No. 200610111159.6, mailed Jun. 23, 2010, 5 pgs.
Office Action from Foreign Counterpart China Application No. 200610111159.6, mailed Jan. 12, 2011, 8 pgs.

* cited by examiner

*Primary Examiner* — Idriss N Alrobaye
(74) *Attorney, Agent, or Firm* — Blakely, Sokoloff, Taylor & Zafman LLP

(57) ABSTRACT

A micro-operation (uop) fusion technique. More particularly, embodiments of the invention relate to a technique to fuse two or more uops originating from two or more instructions.

28 Claims, 7 Drawing Sheets

REPRESENTING A PLURALITY OF INSTRUCTIONS WITH A FEWER NUMBER OF MICRO-OPERATIONS

FIELD

Embodiments of the invention relate to microprocessor architecture. More particularly, embodiments of the invention relate to a technique for representing two or more microprocessor instructions with a fewer a number of micro-operations (uops) than are within the microprocessor instructions.

BACKGROUND

In typical high-performance, superscalar microprocessors, one technique to improve performance is to reduce the number of micro-operations ("uops") to perform various microprocessor instructions by combining one or more uops into a "fused" uop that can be executed as a single uop. The term "uop" is used throughout this disclosure to describe any sub-instruction or operation into which an instruction may be decoded in order for a processor to perform the operations prescribed by the instruction.

Prior art uop fusion techniques have typically been used to combine uops generated from a single instruction. Furthermore, some prior art uop fusion techniques may un-fuse the fused uops within a processor pipeline, or otherwise before the uops can be retired and committed to processor state. Un-fusing fused uops before retirement of the corresponding instruction may reduce some of the performance benefits of uop fusion.

In either case, prior art uop fusion techniques may be inefficient in some circumstances, in terms of processor and/or computer system performance.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Figure 1:
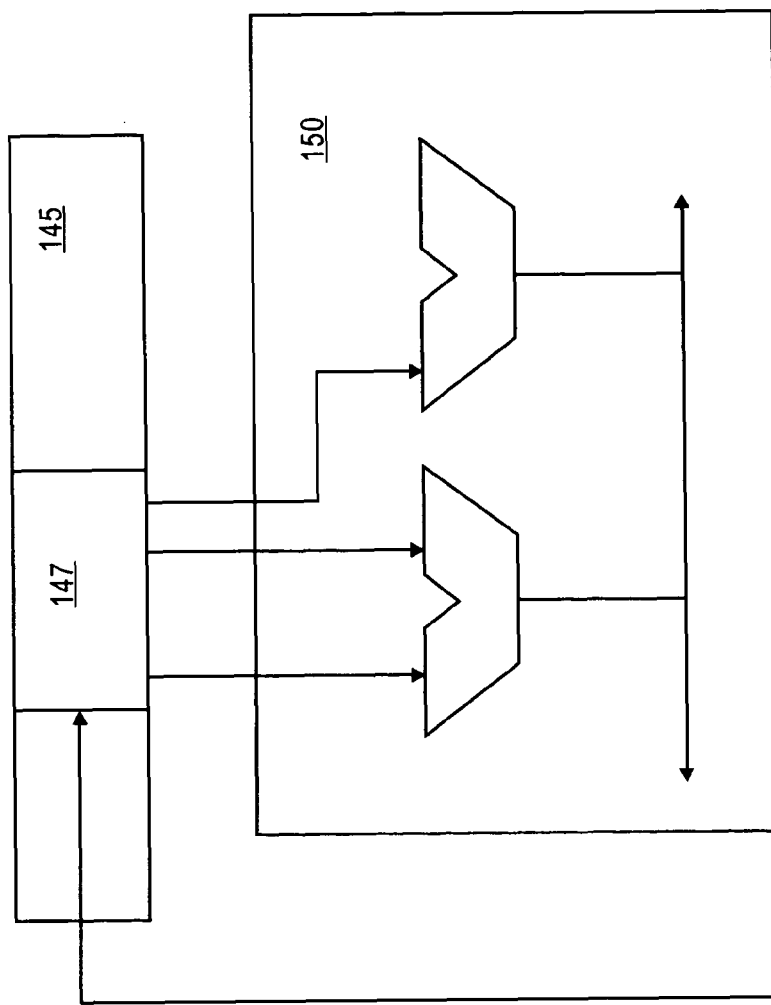
FIG. 1 illustrates logical elements to represent an instruction combination technique according to one embodiment of the invention.
Figure 1:
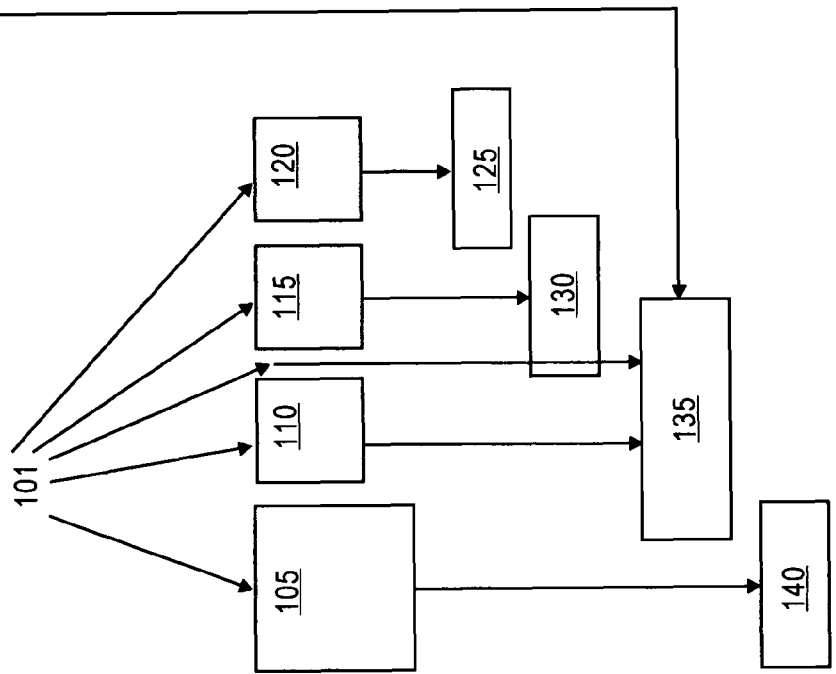

Embodiments of the invention pertain to microprocessor architecture. More particularly, embodiments of the invention pertain to a technique to represent two or more instructions or micro-operations ("uops") with a fewer number of uops than contained within any of the two or more instructions, which can then be executed and retired by the microprocessor in a manner that will result in substantially the same processor state as executing and retiring the instructions or uops themselves. In one embodiment, two instructions are identified that may be represented by a single uop, the two instructions are represented by a single uop, which is executed and retired to result in substantially the same processor state as if the instructions were each executed and retired.

In some embodiments of the invention, two or more instructions appearing either adjacent or non-adjacent to each other in program order may be represented by one uop if the two or more instructions are suitable for combining. In one embodiment, two or more instructions are suitable for combining if a result of executing a first uop associated with a first instruction may be used by a second uop associated with a second instruction, which may or may not appear adjacent to each other in program order. The combined result of the two operation may consist of partial result of the two uops—for example the register value of the first uop and the flags of the second uop. The flags of the first uop are discarded since the flags of the second uop overrides the flags of the first uop. For example, an instruction that adds two operands ("add" instruction) may source another instruction that compares ("cmp" instruction) the result of the add instruction with another operand. Therefore, in one embodiment of the invention, the uop(s) responsible for performing the add operation and the uop(s) responsible for performing the compare operation may be represented by one uop that performs both the add and compare operation.

In another embodiment, more than two instructions appearing adjacent or non-adjacent to each other in program order may be represented by a single uop. For example, in one embodiment, an instruction that causes an operand to be incremented in value ("inc" instruction), a cmp instruction, and an instruction to change an instruction pointer based on the result of the cmp instruction ("jump" instruction) may be represented by a single uop to perform all three instructions when executed, since uops associated with all three instructions are functionally related (e.g., an output of the inc instruction is used by the cmp instruction, the output of which is used by the jump instruction). In this case, the combined result consists of the register value, whereas any flags or target addresses are stored elsewhere. However, in other embodiments, the flags and target addresses may be stored with the register value.

In general, embodiments of the invention may help improve performance of a microprocessor or computer system to which an embodiment corresponds. For example, at least one embodiment may increase instruction decode bandwidth, by allowing more instructions to be decoded than the prior art for the same amount of decoding resources. Further performance improvements may be possible from some embodiments of the invention to the extent that embodiments enable increased uop renaming bandwidth, increased uop reservation and/or re-order capacity, decreased uop execution latency, reduced power consumption, or increased retirement bandwidth. Some or all of the above mentioned benefits may be realized from one or more embodiments of the invention described herein.

FIG. 1 illustrates logical elements that may be used to perform an instruction combination technique according to one embodiment of the invention. FIG. 1 may include other logical elements, in other embodiments. Furthermore, the logical elements of FIG. 1 may be used in an electronics devices, such as a microprocessor, microcontroller, or other device. The logical elements illustrated in FIG. 1 may also be distributed across a number electronics devices, such as a number of processors. Moreover, one or more of the logical elements of FIG. 1 may represent hardware logic, such as logic composed of complementary metal-oxide-semiconductor (CMOS) gates, software, such as program routines composed of machine-readable instructions, or some combination of hardware logic and software.

In particular, FIG. 1 illustrates an instruction queue 101 to store instructions that are to be executed by a processor execution unit 150 after being decoded into uops by decoders 105-120. In one embodiment illustrated in FIG. 1, instructions are read from the instruction queue from the bottom to top, whereas in other embodiments, instructions may be read in some other order, such as top to bottom. In one embodiment, the first instruction is decoded by decoder 105 and the corresponding uop is stored in register 140, the second instruction is decoded by decoder 110 and the corresponding uop is stored in register 135, the fourth instruction is decoded by decoder 115 and the corresponding uop is stored in register 130, and the fifth instruction is decoded by decoder 120 and the corresponding uop is stored in register 125. In other embodiments, the decoded uops may be stored in other storage structures or combined into one or more registers.

In one embodiment, the third instruction is found to be related to the second instruction in such a way so as to enable the representation of the second and third instructions by a single uop. For example, in one embodiment, the second instruction may be an instruction to compare two values ("cmp" instruction), whereas the third instruction may be an instruction to change an instruction pointer (e.g., "jump" instruction) based on the result of the cmp instruction (e.g. jump if the values compared by the cmp instruction are not equal, or "jne" instruction). In the case that the second instruction and third instruction are a cmp and jne instruction, respectively, one embodiment may represent the two instructions with a uop that performs both instructions, such as one that compares two values and takes a conditional branch based off of the result of the compare (e.g., "cmpjcc" uop) and produces the jump target and the flags of the CMP. In this case, the third instruction may not have to be decoded, and only the jump target of the instruction is passed to the cmpjcc uop.

In one embodiment, the decoding of the cmp instruction is an indication that the next instruction will be some jump instruction, and therefore no other decoding of the jump instruction is necessary. However, in other embodiments, the second instruction may be another instruction for which the subsequent instruction may not be assumed, but must actually be decoded. In this case, the third instruction may have to be sent through decode logic before the uop representing the second and third instruction is determined.

In other embodiments, the two instructions to be represented by a single uop are not adjacent to each other in the instruction queue, but are instead separated by one or more instructions.

In general, embodiments of the invention enable two or more instructions that are to be represented by a number of uops that is less than the number of uops in any of the two or more instructions. Therefore, embodiments of the invention may increase the bandwidth of the available decoding logic by not having to decode one or more instructions, based on identifying an instruction or instructions that may be combined with other instructions and represented by a single uop or at least fewer uops than any of the combined instructions include.

Referring again to FIG. 1, the uops stored in the individual registers 125-140 depend on the corresponding instructions stored in the instruction queue. For example, in one embodiment, the first and fourth instructions may be an instruction to load data from a memory source (e.g., "load" instruction). Therefore, the uops stored in registers 140 and 130 may be a uop that corresponds to a load instruction (e.g., "load" uop). Similarly, the fifth instruction may be an arithmetic instruction, such as an instruction to multiply two or more values (e.g., "mul" instruction). Therefore, the uop stored in register 125 may be a uop that corresponds to a mul instruction (e.g., "mul" uop). Because, in one embodiment, the second and third instruction were determined to be related in such a way that they may be represented by one uop (e.g., "cmpjcc" uop), the register 135 may contain a uop that is to perform both the second and third instructions when executed.

FIG. 1 also illustrates a reservation station 145 in which the uops stored in the registers 125-140 may be ordered and scheduled for execution by the execution unit 150. In particular, the reservation station may store a uop representing one or more instructions, such as the cmpjcc uop 147, until it is issued to the execution unit. After the cmpjcc, or other uop, is executed by the execution unit, the processor's state information must change and be visible to other electronics devices and programs, accordingly, by "retiring" the cmpjcc uop. Because the uop to be retired may be a uop representing two or more instructions, the resulting state information must be represented in a manner to reflect the execution of the uop as if it were a number of uops equal to the number of instructions it represents.

In embodiments in which execution of a uop representing two or more instructions results in a fault, trap, or assist, it may need to be determined which portion of the uop caused the fault, trap or assist in order to maintain proper machine state during retirement. For instance, in one embodiment a page fault may only result from the cmp portion of the cmpjcc uop. In this case, a page fault service routine can be called along with state information from just before the cmp portion of the cmpjcc uop is performed. In one embodiment, techniques already understood in the art may be used to handle the case in which a page fault results from the cmp portion of the cmpjcc uop. Similarly, a trap may only result from the jcc portion of the cmpjcc uop, in one embodiment. In this case, a service routine could be called to service the trap with the machine state resulting from the completion of the cmpjoc uop. In one embodiment, a technique to service the trap may be substantially similar or the same to those techniques used to service an un-fused jcc operation, already understood in the art.

For the purposes of this disclosure, unless otherwise specified, a faulted instruction is serviced by an exception handler with state information resulting from executing instructions appearing in program order prior to execution of the instruction that caused the fault. For example, in one embodiment, if a page fault occurs, the instruction state resulting from executing instructions appearing in program order prior to the instruction causing the page fault is sent to a fault handling routine, such that the intended page can be retrieved and the faulting instruction re-executed.

On the other hand, unless otherwise specified, an instruction causing a trap condition is serviced by an exception handler with state information resulting from executing the instruction causing the trap. For example, in one embodiment, if a data break-point debug trap occurs, the instruction causing the trap is retired and the corresponding processor state committed before a service routine is called to service the trap.

In the case that two or more instructions are represented by a uop whose component fault, trap, or assist states are not mutually exclusive from each other, such as when there are multiple jcc operations or cmp operations performed by the uop, it may not be clear whether the state just before the execution of the uop should be used at retirement of the uop or whether the state just after the execution of uop should be used as the correct state information to service the trap, fault, or assist. In this case, a special service routine may need to be called to generate the conditions resulting from the component operations of the uop individually.

For example, in one embodiment, in which a cmpjcc uop represents a compare and jump instruction, a code segment violation may occur as a result of executing either operations corresponding to the cmp portion of the uop or the jcc portion of the uop. In order to determine which component operation caused the code segment violation and therefore the correct state that should be provided to a service routine to correct the problem, a special service routine may first need to be called to restore the state of the cmp portion of the uop to determine if the code segment violation resulted from the cmp operation. If not, it may be deduced that the jcc portion of the uop caused the code segment violation and therefore the service routine to handle the violation may be called with the state information resulting from the execution of the cmpjcc rather than the intermediate state between the cmp and jcc portions of the cmpjcc uop.

If a fault or other condition results from the execution of both (or more, in the case of a uop representing more than two instructions) component operations of a uop representing two or more instructions, then the uop portion resulting in the condition may be determined by executing the component operations individually rather than in a uop representing two or more instructions. However, it may be relatively rare that more than one condition occurs as a result of executing two or more component operations of a uop representing two or more instructions.

Below is a descriptions with reference to FIGS. 2, 3, 4, and 5 illustrating how various aspects of at least one embodiment of the invention may be performed. Other techniques, other than those explicitly discussed in reference to FIGS. 2, 3, 4, and 5 may be used to carry out the corresponding aspects other embodiments of the invention. Furthermore, some of the discussion below with reference to FIGS. 2, 3, 4, and 5 illustrate aspects of at least one embodiment, in which two instructions are combined and represented by at least one fused uop. However, in other embodiments the following description with reference to FIGS. 2, 3, 4, and 5 may be applied to embodiments in which more than two instructions are combined and represented with one or more fused uops.

Figure 2:
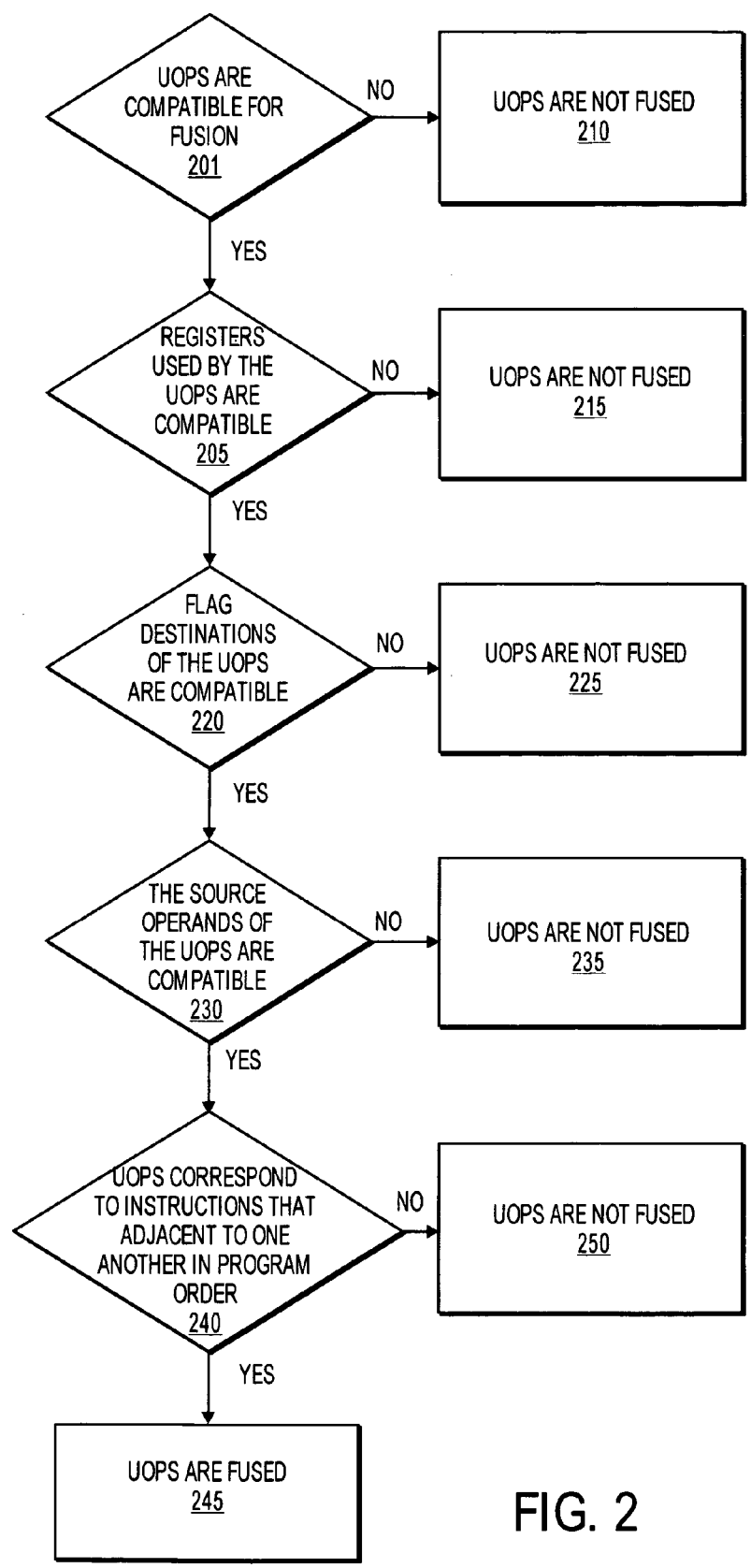
FIG. 2 is a flow chart illustrating, operations that may be performed to determine whether two micro-operations (uops), adjacent in program order, should be fused, according to one embodiment of the invention.

FIG. 2 is a flow chart illustrating operations that may be performed to determine whether two uops, corresponding to instructions adjacent in program order, should be fused, according to one embodiment of the invention. At operation 201 it is determined whether the two uops are compatible for fusion. In one embodiment, two or more uops are compatible for fusion if an output of one uop will source other uops to be fused. If not, then at operation 210, the uops are not fused. If so, then at operation 205 it is determined whether registers used by the two uops are compatible. In one embodiment, the registers of the two uops are compatible if they are the same destination register for the two uops, in which case the second uop of the pair may overwrite the destination register of the first, or one of the uops does not have a destination register, and therefore either uop may use the destination register. If the registers are not compatible, then at operation 215, the uops are not fused. If the registers of the two uops are compatible, then at operation 220 it is determined whether the flag destinations of the two uops are compatible. In one embodiment, the flag destinations are compatible if either both uops overwrite the same flag(s), in which case the second of the two uops is the last to update the flags, or only one of the uops updates flag fields. If the flag destinations of the two uops are not compatible, then at operation 225 the uops are not fused.

If the flag destinations are compatible, then at operation 230 it is determined whether the source operands of the two uops are compatible. In one embodiment, the source operands are compatible if register operands in from both uops do not overflow the available registers to store the source operands, immediate/displacement values do not overflow the available storage, and results forwarded from the first uop to the second uop may be handled implicitly or explicitly. If the source operands are not compatible, then at operation 235, the uops are not fused.

If the source operands are compatible, then at operation 240, it is determined whether the two uops correspond to instructions that adjacent to one another in program order. If so, then at operation 245, the two instructions are represented by a single fused uop that performs the functions of at least two uops of the two instructions, respectively. Otherwise, the uops are not fused at operation 250.

Figure 3:
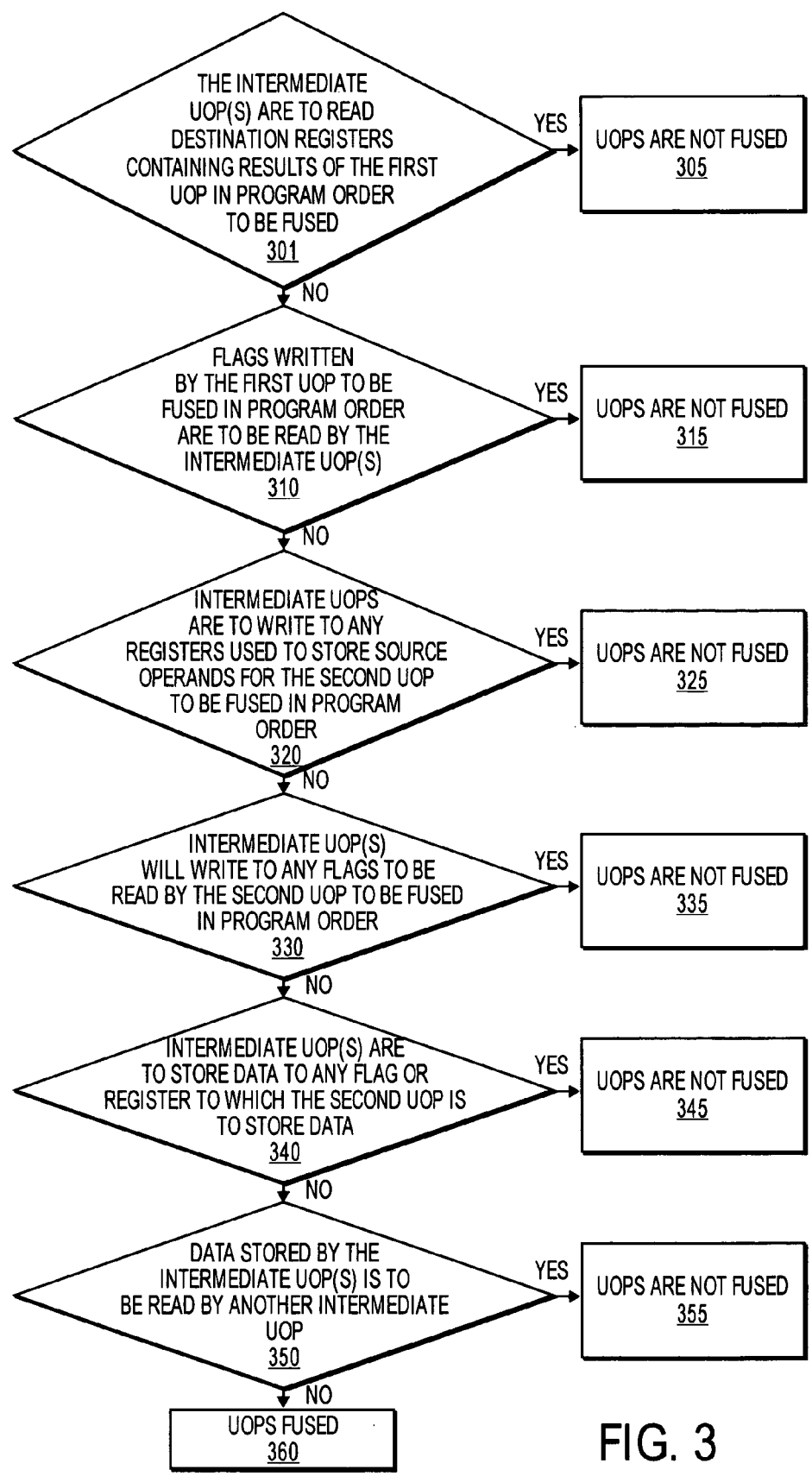
FIG. 3 is a flow chart illustrating operations that may be performed to determine whether two micro-operations (uops), non-adjacent in program order, should be fused, according to one embodiment of the invention.

FIG. 3 is a flow diagram illustrating operations that may be used in one embodiment of the invention, in which two or more uops correspond to instructions that are non-adjacent to each other in program order. In one embodiment, the flow chart illustrates operations used in conjunction with one embodiment when a first and second uop are separated in program order by one or more intermediate uops. For example, at operation 301 it is determined whether the intermediate uop(s) are to read destination registers containing results of the first uop in program order to be fused. If so, then at operation 305, the first and second uops are not fused.

If the intermediate uop(s) will not read destination registers containing results from the first uop in program order to be fused, then at operation 310, it is determined whether flags written by the first uop to be fused in program order are to be read by the intermediate uop(s). If so, then at operation 315 the uops are not fused. If the flags of the first uop to be fused in program order are not to be read by the intermediate uop(s), then at operation 320, it is determined whether the intermediate uop(s) are to write to any registers used to store source operands for the second uop to be fused in program order. If so, then at operation 325, the uops are not fused.

If the intermediate uop(s) will not write to any registers used to store source operands for the second uop to be fused in program order, then at operation 330, it is determined whether the intermediate uop(s) will write to any flags to be read by the second uop to be fused in program order. If so, then at operaiton 335, the first and second uops are not fused. If, however, the intermediate uop(s) will not write to any flags read by the second uop to be fused in program order, then at operation 340, it is determined whether the intermediate uop (s) are to store data to any flag or register to which the second uop is to store data. If not, then at operation 345, the first and second uops are fused.

If so, then at operation 350, it is determined whether data stored by the intermediate uop(s) is to be read by another intermediate uop. If so, then at operation 355, the first and second uops are not fused. If not, then the first and second uops may be fused at operation 360 and the intermediate uop(s) that are to store data to a register or flag to which the second uop is to store data may be ignored. In some embodiments, the intermediate uop(s) may be marked as "non-writing" intermediate uops in order to indicate to a program or logic that the intermediate uop(s) may be ignored and the first and second uops may be fused.

Figure 4:
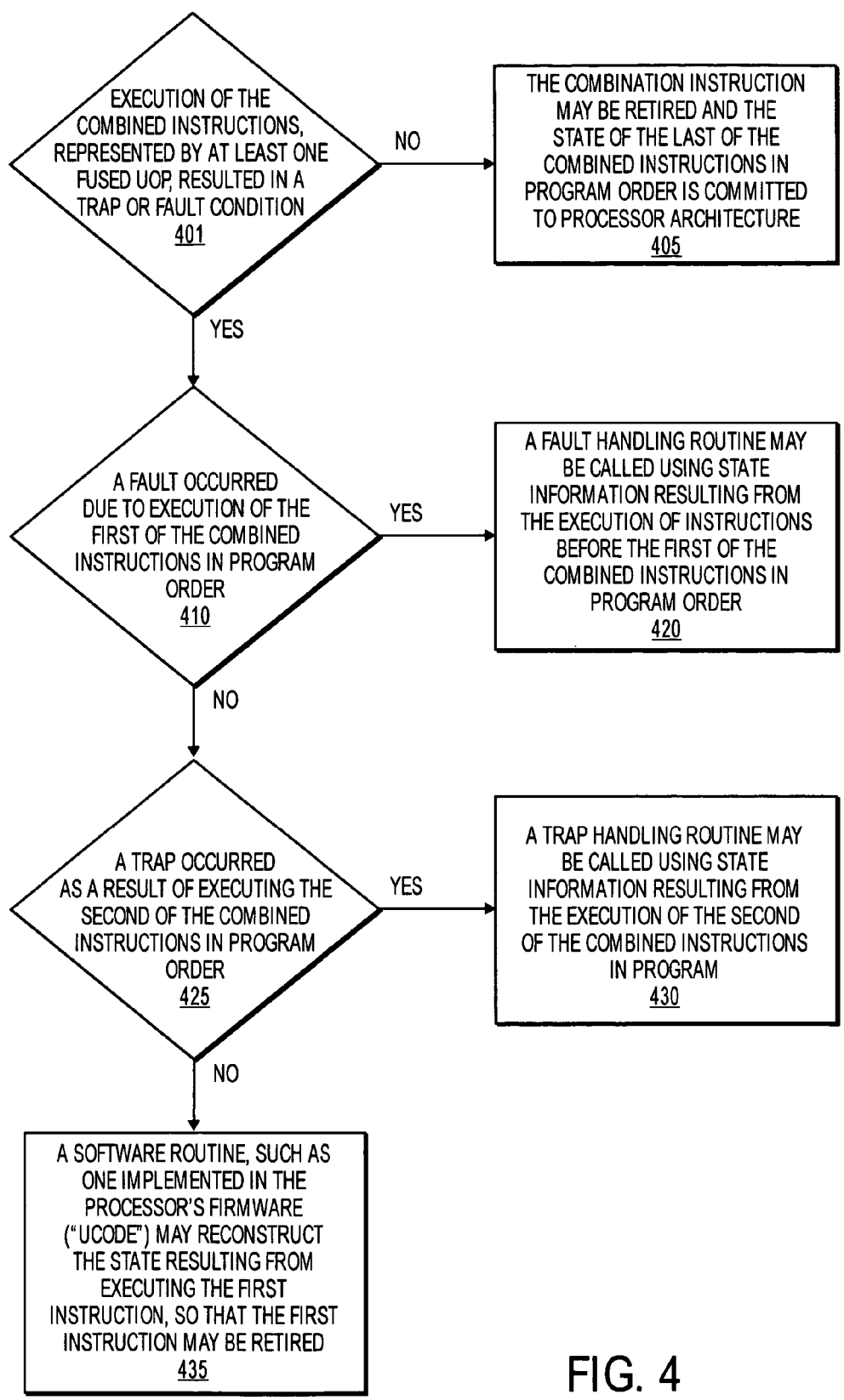
FIG. 4 is a flow chart illustrating operations that may be performed to determine how two micro-operations (uops), adjacent in program order, are to be retired according to one embodiment of the invention.

FIG. 4 is a flow chart illustrating operations that may be performed to determine how two uops, corresponding to instructions adjacent in program order, are to be retired according to one embodiment of the invention. At operation 401, it is determined whether execution of the combined instructions, represented by at least one fused uop, resulted in a trap or fault condition. If not, then the combined instruction may be retired at operation 405 and the state of the last of the combined instructions in program order is committed to processor architecture. If a fault or trap occurred, then at operation 410, it is determined whether a fault occurred due to execution of the first of the combined instructions in program order. If so, then at operation 420, a fault handling routine may be called using state information resulting from the execution of the first of the combined instructions in program order. If not, then at operation 425 it is determined whether a trap occurred as a result of executing the second of the combined instructions in program order. If so, then at operation 430, a trap handling routine may be called using state information resulting from the execution of the second of the combined instructions in program order.

If not, then a trap may have occurred as a result of executing the first of the combined instructions or a fault may have occurred as a result of executing the second of the combined instructions. Alternatively, multiple exceptions may have occurred, so that the correct resulting state may not be able to be determined. In this case, at operation 435, a software routine, such as one implemented in the processor's firmware ("ucode") may reconstruct the state resulting from executing the first instruction, so that the first instruction may be retired. This is possible since the result of the first uop (flags and target register) are available.

In one embodiment, ucode may determine and prioritize the exception conditions resulting from executing the first instruction of the combined instruction, which was represented by one or more fused uops. Furthermore, after the state resulting from executing the first of the combined instructions is reconstructed, the retirement of the first of the combined instruction will cause a fault or trap handling routine to be invoked. In one embodiment, if the first of the combined instruction causes a trap, the processor state resulting between the execution of the first and second combined instructions ("intermediate" state) may be determined by the ucode routine mentioned above. On the other hand, if there was no exception resulting from executing the first of the combined instructions, and exception state resulting from executing the second of the combined instructions is ambiguous, then ucode may re-execute the second of the combined instructions and respond to an exception in the same manner as if the combined instructions were executed separately.

Figure 5:
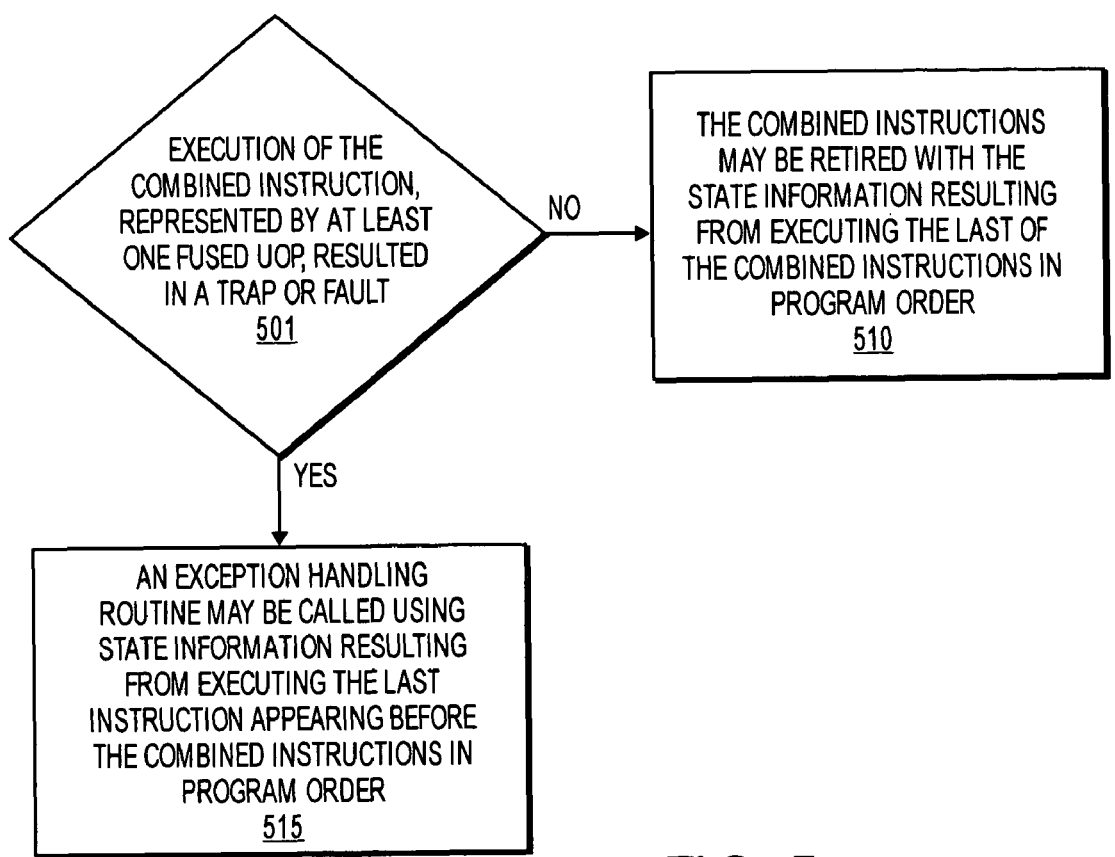
FIG. 5 is a flow chart illustrating operations that may be performed to determine how two micro-operations (uops), non-adjacent in program order, are to be retired according to one embodiment of the invention.

FIG. 5 is a flow chart illustrating operations that may be performed to determine how two uops, corresponding to instructions non-adjacent in program order, are to be retired according to one embodiment of the invention. At operation 501, it is determined whether execution of the combined instruction, represented by at least one fused uop, resulted in a trap or fault. If not, at operation 510, the combined instructions may be retired with the state information resulting from executing the last of the combined instructions in program order. If so, then at operation 515, an exception handling routine may be called. In one embodiment, the exception handling routine may restart the execution of the combined instruction from the first of the combined instructions with a mechanism in place, such as a flag, to prevent the combined instructions from being executing again as a fused uop. In one embodiment, the first of the combined instructions will complete with a fault or trap, which may be handled by a fault or trap handling routine. Alternatively, the first of the combined instructions may simply retire if a fault occurred as a result of executing an intermediate uop occurring between the fused uops in program order.

Figure 6:
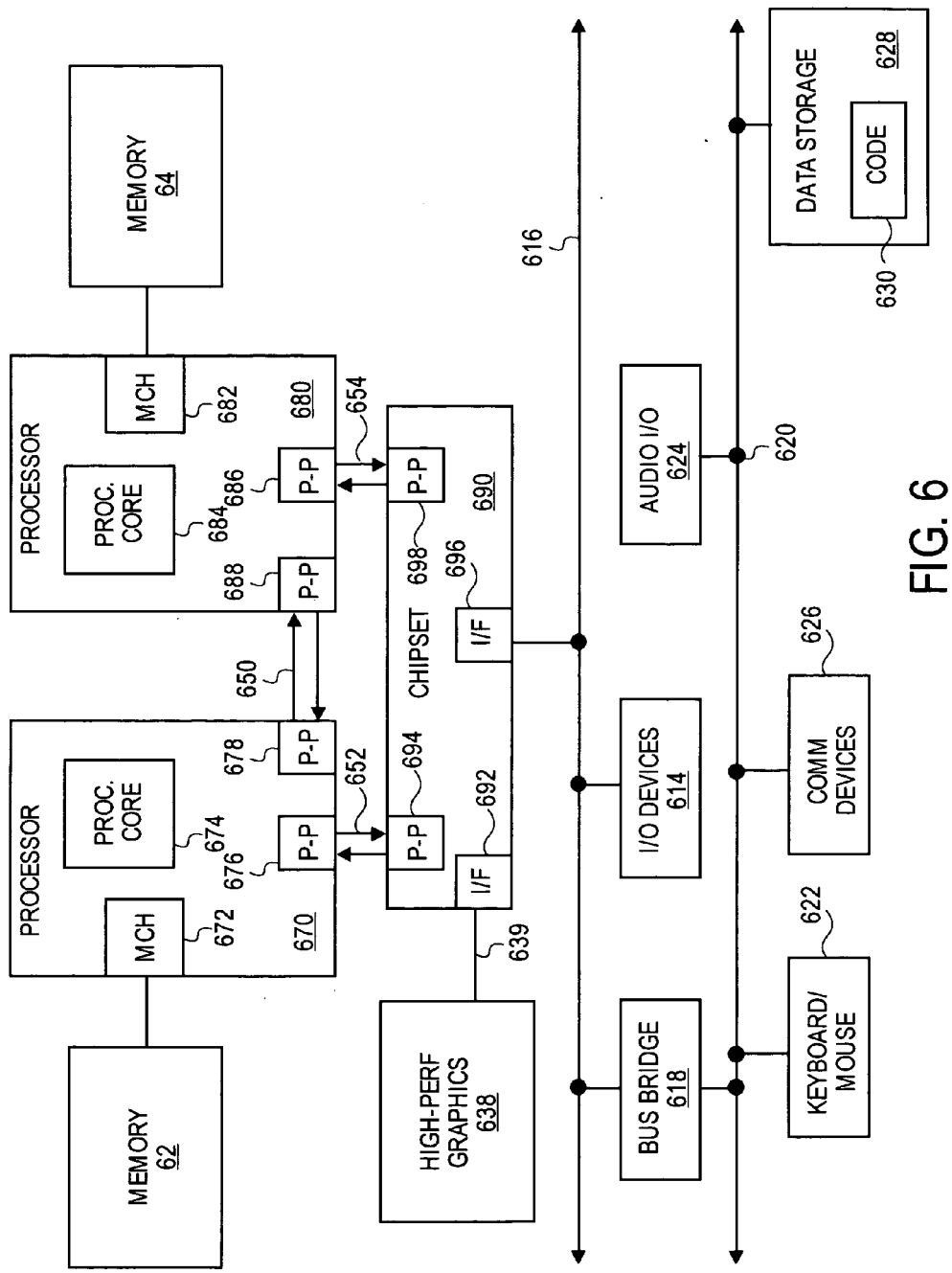
FIG. 6 is a computer system having a point-to-point bus architecture in which one embodiment of the invention may be used.

FIG. 6 illustrates a point-to-point (PtP) computer system in which one embodiment may be used. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639.

At least one embodiment of the invention may be located within processing cores within each of the PtP bus agents of FIG. 6. Other embodiments of the invention, however, may exist in other circuits, logic units, or devices within the system of FIG. 6. Furthermore, other embodiments of the invention may be distributed throughout several circuits, logic units, or devices illustrated in FIG. 6.

Figure 7:
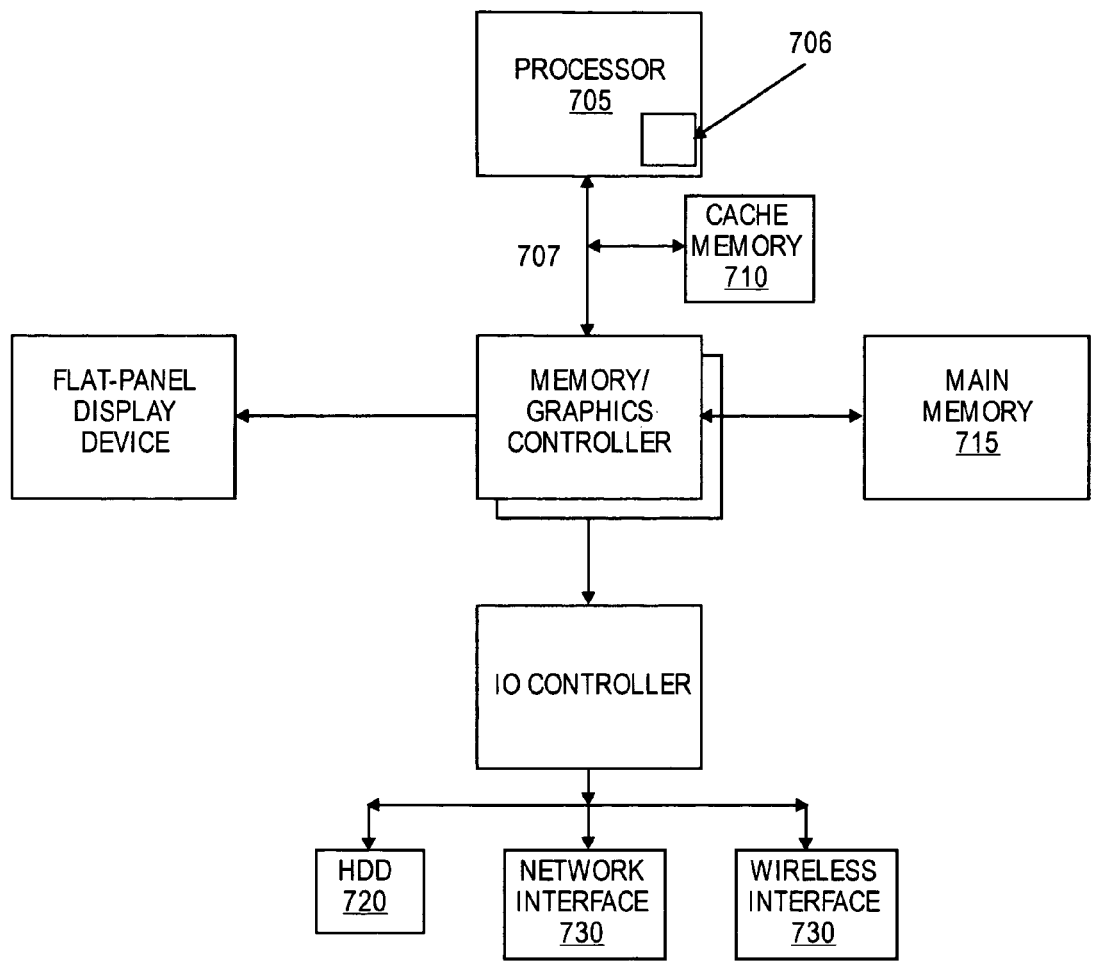
FIG. 7 is a computer system having a shared bus architecture in which one embodiment of the invention may be used.

FIG. 7 illustrates a front-side-bus (FSB) computer system in which one embodiment of the invention may be used. A processor 705 accesses data from a level one (L1) cache memory 710 and main memory 715. In other embodiments of the invention, the cache memory may be a level two (L2) cache or other memory within a computer system memory hierarchy. Furthermore, in some embodiments, the computer system of FIG. 7 may contain both a L1 cache and an L2 cache, which comprise an inclusive cache hierarchy in which coherency data is shared between the L1 and L2 caches. In other embodiments there may be more than 1 cache hierarchy.

Illustrated within the processor of FIG. 7 is one embodiment of the invention 706. Other embodiments of the invention, however, may be implemented within other devices within the system, such as the graphics controller, or distributed throughout the system in hardware, software, or some combination thereof.

The main memory may be implemented in various memory sources, such as dynamic random-access memory (DRAM), a hard disk drive (HDD) 720, or a memory source located remotely from the computer system via network interface 730 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed. Within, or at least associated with, each bus agent is at least one embodiment of invention 706, such that store operations can be facilitated in an expeditious manner between the bus agents.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
   at least two decoders to decode at least two instructions into at least two micro-operations (uops);
   a storage unit to store the at least two uops;
   uop fusion logic to fuse the at least two uops into a single fused uop that is to represent the complete function of the at least two uops, wherein the at least two uops are to be fused into the single fused uop in response to a determination that the at least two uops are compatible for fusion, wherein: two or more uops are considered to be compatible for fusion if an output of one uop is to source one or more uops to be fused; registers accessed by the two or more uops are compatible if they have the same destination register for the two or more uops; flag destinations of the two or more uops are compatible if both of uops overwrite the same flag; source operands of the two or more uops are compatible if operands from both of the uops do not overflow the available registers to store the source operands; and the at least two instructions are adjacent to each other in program order;
   execution logic to process the fused uop without unfusing the fused uop; and
   determination logic to determine whether processing of the fused uop results in a trap, assist, or fault condition, wherein if no trap, assist, or fault condition occurs, the fused uop is retired.

2. The apparatus of claim 1 wherein a destination storage location of a result of executing a first one of the plurality of instructions is a source storage location of an operand of a second one of the plurality of instructions.

3. The apparatus of claim 2 wherein the first and second one of the plurality of instructions are adjacent to each other in program order.

4. The apparatus of claim 2 wherein the first and second one of the plurality of instructions are non-adjacent to each other in program order.

5. The apparatus of claim 2 wherein the single fused uop is to be retired in an order to maintain correct state within a processor in which the single fused uop is to be executed.

6. The apparatus of claim 1 further comprising a reservation station to store operands, memory offsets, and branch targets associated with the single fused uop.

7. The apparatus of claim 6 further comprising an execution unit to execute the single fused uop.

8. The apparatus of claim 7 further comprising a retirement unit to commit state information resulting from executing the single fused uop to machine state.

9. A system comprising:
   a memory unit to store two or more instructions to be represented by one micro-operation (uop);
   at least two decode logics to decode the two or more instructions into at least two or more uops;
   a first logic to cause representation of the two or more instructions by a single fused uop that is to represent the complete function of the at least two uops, wherein the two or more instructions are to be decoded by the decode logics, wherein the single fused uop corresponds to one of a plurality of operations into which the two or more instructions are to be decoded and wherein the single fused uop is to be generated in response to a determination that at least two uops, corresponding to the single fused uop, are compatible for fusion, wherein: two or more uops are considered to be compatible for fusion if an output of one uop is to source one or more uops to be fused; registers accessed by the two or more uops are compatible if they have the same destination register for the two or more uops; flag destinations of the two or more uops are compatible if both of uops overwrite the same flag; source operands of the two or more uops are compatible if operands from both of the uops do not overflow the available registers to store the source operands; and the two or more instructions are adjacent to each other in program order;
   execution logic to process the single fused uop without unfusing the fused uop; and
   determining whether processing of the fused uop results in a trap, assist, or fault condition and if no trap, assist, or fault condition occurs the fused uop is to be retired.

10. The system of claim 9 further comprising a processor to execute the single fused uop and retire the single fused uop such that correct processor state is maintained.

11. The system of claim 9 further comprising an audio I/O coupled to the memory unit.

12. The system of claim 10 wherein the processor comprises an instruction queue to store the two or more instructions adjacently to each other before being decoded by the decode logics.

13. The system of claim 10 wherein the processor comprises an instruction queue to store the two or more instructions non-adjacently to each other before being decoded by the decode logics.

14. The system of claim 9 wherein the two or more instructions comprise a first instruction to compare two operands and a second instruction to change an instruction pointer in response to the result of the compare of the two operands.

15. The system of claim 9 wherein the two or more instructions comprise a first instruction to generate a sum of a first and second operand and a second instruction to compare the sum with a third operand.

16. The system of claim 9 wherein the first logic comprises at least one instruction, which when executed by a processor causes the processor to determine whether the two or more instructions are to be represented by a single fused uop.

17. A method comprising:
    decoding, at two decoders, two or more instructions into at least two micro-operations (uops);
    storing the at least two uops in a storage unit;
    fusing, at a uop fusion logic, the at least two uops into a single fused uop that is to represent the complete function of the at least two uops, wherein the at least two uops are to be fused into the single fused uop in response to a determination that the at least two uops are compatible for fusion, wherein: two or more uops are considered to be compatible for fusion if an output of one uop is to source one or more uops to be fused; registers accessed by the two or more uops are compatible if they have the same destination register for the two or more uops; flag destinations of the two or more uops are compatible if both of uops overwrite the same flag; source operands of the two or more uops are compatible if operands from both of the uops do not overflow the available registers to store the source operands; and the two or more instructions are adjacent to each other in program order;

processing, at an execution logic, the fused uop without unfusing the fused uop; and determining, at a determination logic, whether processing of the fused uop results in a trap, assist, or fault condition, wherein if no trap, assist, or fault condition occurs, the fused uop is retired.

18. The method of claim 17, further comprising examining a relationship between a source operand storage location of a first one of the two or more instructions and a result destination storage location of a second one of the two or more instructions.

19. The method of claim 17, further comprising reordering the single fused uop in relation to other uops whose execution are to result in an incorrect machine state.

20. The method of claim 19, further comprising calling a service routine to generate correct machine state if the execution of the single fused uop is to result in a condition chosen from a group comprising: a fault, an assist, and a trap.

21. The method of claim 20, wherein the service routine is to use state information resulting from the execution of uop immediately before the single fused uop.

22. The method of claim 20, wherein the service routine uses state information resulting from execution of the single fused uop.

23. The method of claim 20, wherein the service routine uses state information resulting from the execution of a uop corresponding to the first in program order of the two or more instructions.

24. A non-transitory machine-readable medium having stored thereon a set of instructions, which if executed by a machine cause the machine to:

decode two or more instructions into at least two micro-operations (uops);

store the at least two uops;

fuse the at least two uops into a single fused uop that is to represent the complete function of the at least two uops, wherein the at least two uops are to be fused into the single fused uop in response to a determination that the at least two uops are compatible for fusion, wherein: two or more uops are considered to be compatible for fusion if an output of one uop is to source one or more uops to be fused; registers accessed by the two or more uops are compatible if they have the same destination register for the two or more uops; flag destinations of the two or more uops are compatible if both of uops overwrite the same flag; source operands of the two or more uops are compatible if operands from both of the uops do not overflow the available registers to store the source operands; and the two or more instructions are adjacent to each other in program order;

process the fused uop without unfusing the fused uop; and determine whether processing of the fused uop results in a trap, assist, or fault condition, wherein if no trap, assist, or fault condition occurs, the fused uop is retired.

25. The machine-readable medium of claim 24, wherein if one of the conditions occurred as a result of executing operations corresponding to a first of the two or more instructions and not a second of the two or more instructions, causing the machine to store machine state resulting from operations corresponding to the first of the two or more instructions.

26. The machine-readable medium of claim 24, wherein if one of the conditions occurred as a result of executing operations corresponding to a second of the two or more instructions, causing the machine to store machine state resulting from operations corresponding to the second of the two or more instructions.

27. The machine-readable medium of claim 24, wherein if one of the conditions occurred as a result of executing operations corresponding to a first instruction and a second instruction of the two or more instructions, causing the machine to perform the first and second instructions individually instead of performing the single uop.

28. The machine-readable medium of claim 24, further comprising causing the machine to retire a first and second instruction of the two or more instructions after storing the machine state.

\* \* \* \* \*